United States Patent [19]

Le Dieu

[11] 4,276,637

[45] Jun. 30, 1981

[54] TIME-DIVISION SWITCHING NETWORK AND MEANS OF MITIGATING THE EFFECT OF FAULT CONDITIONS

[75] Inventor: Bernard Le Dieu, Perros-Guirec, France

[73] Assignee: Compagnie Industrielle des Telecommunications Cit-Alcatel, Paris, France

[21] Appl. No.: 45,886

[22] Filed: Jun. 6, 1979

[30] Foreign Application Priority Data

Jun. 19, 1978 [FR] France ................................ 78 18221

[51] Int. Cl.³ .............................................. H04J 3/14
[52] U.S. Cl. .............................. 370/16; 179/175.3 S; 179/175.2 R; 370/58
[58] Field of Search ....... 179/15 AT, 15 BF, 175.3 S, 179/175.2 R; 370/16, 13, 53, 58

[56] References Cited

U.S. PATENT DOCUMENTS

| | | | |
|---|---|---|---|
| 3,851,105 | 11/1974 | Regnier et al. ................ | 179/15 AT |
| 3,959,596 | 5/1976 | Bojanek et al. ................ | 179/15 AT |
| 4,071,702 | 1/1978 | Charransol et al. ............ | 179/15 AT |
| 4,146,749 | 3/1979 | Pepping et al. ................ | 179/15 AT |

FOREIGN PATENT DOCUMENTS

| | | | |
|---|---|---|---|
| 2540577 | 3/1977 | Fed. Rep. of Germany ............ | 370/16 |
| 2156965 | 5/1973 | France . | |
| 2302654 | 9/1976 | France . | |

*Primary Examiner*—Douglas W. Olms
*Attorney, Agent, or Firm*—Sughrue, Rothwell, Mion et al.

[57] ABSTRACT

A switching network is disclosed having a time-division or space-division multiplex incoming stage and outgoing stage in which a terminal unit of the incoming stage and a terminal unit of the outgoing stage form a terminal module (ME1, ME2 . . . MEn) which can handle n multiplex links (LE1, . . . LEn). The terminal modules are formed into groups in which the traffic of a faulty module is distributed among the other terminal modules of the group and forwarded over an auxiliary incoming line (L9, L10, L11, L12) of each terminal module by an input switch (5, 6, 7, 8) associated with each terminal module. An output switch (9, 10, 11, 12) associated with each terminal module and linked to the auxiliary outgoing line (13, 14, 15, 16) of the other modules collects the distributed traffic.

5 Claims, 4 Drawing Figures

TIME-DIVISION SWITCHING NETWORK AND MEANS OF MITIGATING THE EFFECT OF FAULT CONDITIONS

BACKGROUND OF THE INVENTION

The invention relates to time-division switching networks.

Such switching networks are known and may be TST, TSST, STS etc . . . networks, that is to say incorporating at least one space-division multiplex stage between two time-division stages, or else at least one time-division stage between two space-division multiplex stages.

In the case of a TST or TSST switching network, each time-division stage consists of time-division switches each associated with a switching interface linked to time division multiplex (TDM) or space division multiplex (SDM) signal lines. One time-division switch and the switching interface associated with it form a switching unit.

The failure of a switching unit in the incoming stage or the outgoing stage renders the SDM or TDM signal lines linked to this switching unit unserviceable consequently making it impossible to handle traffic from or to subscribers served by the SDM or TDM lines.

Solutions have been proposed to avoid such a problem.

One known solution consists in connecting each incoming switching unit to the preceding and following incoming switching units. In case of failure, each incoming switching unit acts as a backup to the following switching unit in accordance with a cyclic transposition system (if the transposition is reversed, clearly it is the preceding incoming unit which acts as the backup to the faulty switching unit).

In another known solution, each time-division switch in the incoming stage forms part of a module which also incorporates its two concentrators in parallel linked to the module's incoming subscriber lines. The outlet of one of the concentrators is multiplex linked to the time-division switch and the outlet of the other concentrator is multiplex linked to the time-division switch of the following module. If one module fails, with the exception of the concentrator linked to the following module, the traffic which was normally handled by the faulty module is distributed step by step over the other modules.

These solutions have the disadvantage of transferring all the traffic of the faulty switching unit or module on to the adjacent switching unit; in the first known solution this involves dividing the space-division switch between the incoming and outgoing switching units into two and duplicating the speech memory of each incoming and outgoing switching unit; in the second solution it involves duplicating the line concentrators and considerably increasing the subscriber line concentration rate and therefore the blocking rate.

Another known solution consists in using an additional standby switching unit for a number of switching units, to handle the traffic of the faulty switching unit. This solution requires the additional switching unit to be linked to all the other switching units, involving a not insubstantial wiring cost and the need to monitor it since it too may well become faulty.

A method is also known in which an incoming stage switching unit is associated with an outgoing stage switching unit to form a terminal module; in the last solution quoted it is a standby terminal module which handles the traffic from a faulty terminal module; such a standby terminal module associated with a number of terminal modules forms a group and the switching network therefore contains several of these groups.

SUMMARY OF THE PRESENT INVENTION

The invention relates to a switching network in which all of the terminal modules are active units and constitute groups, the traffic from one faulty terminal module being shared between the other terminal modules in the group.

A switching network according to the invention comprises an inlet switch and an outlet switch associated with each terminal module; each inlet switch is linked to the terminal module with which it is associated and also linked to a TDM or SDM signal line grouping each of the incoming lines connecting to the terminal modules other than that with which it is associated; each outlet switch is linked to the terminal module with which it is associated to handle the traffic from said terminal module when it is operating normally, and also linked to an auxiliary outlet from each of the other modules to handle the traffic from the terminal module with which it is associated when this module is faulty; each outlet switch is linked to an outgoing line.

BRIEF DESCRIPTION OF THE DRAWINGS

The invention is described with respect to examples of embodiments illustrated by the attached drawings in which.

DESCRIPTION OF THE PREFERRED EMBODIMENT

Figure 1:
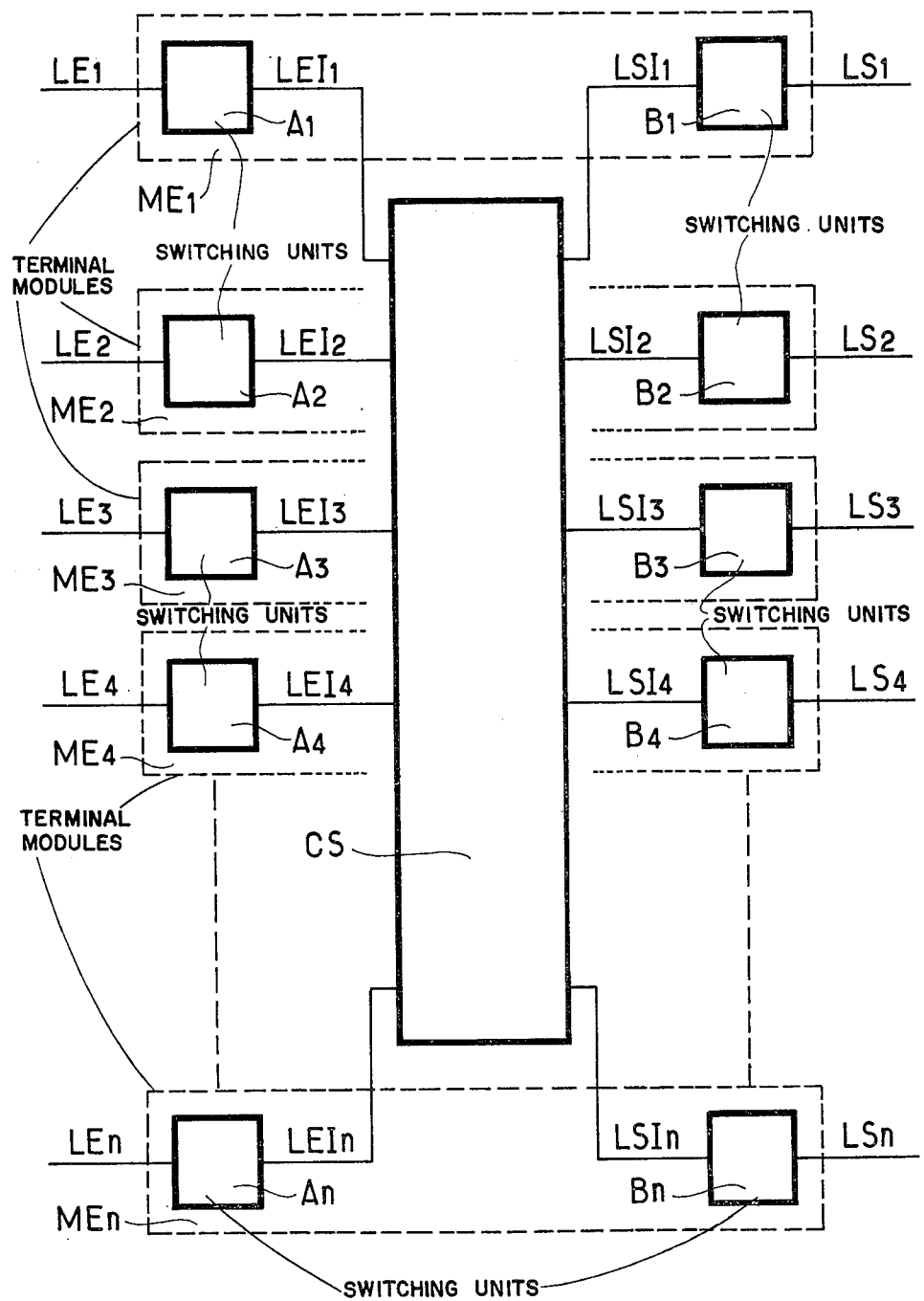
FIG. 1 is a schematic representation of a switching network to which the invention applies

FIG. 1 shows a known type of time-space-time-division switching network, comprising a time-division incoming stage, a time-division outgoing stage and an intermediate stage or space-division switch CS. While the specification refers to the provision of time division multiplexed signal lines, the apparatus according to the present invention may also be used with space division multiplexed signal lines.

The incoming stage consists of incoming switching units $A_1, A_2, \ldots A_n$, each linked to an incoming line $LE_1, LE_2, \ldots LE_n$, respectively, each incoming line consisting of several TDM signal lines, for example 16, each of the TDM signal lines providing a number of time multiplexed channels, for example 32, to provide $16 \times 32 = 512$ supermultiplexed channels. Each incoming switching unit comprises a switching interface and a time division switch, as is already known, the switching interface being linked to the time-division switch by a supermultiplex line and also linked by an incoming line.

The outgoing stage consists of switching units $B_1, B_2 \ldots B_n$ linked at their output to an outgoing line $LS_1, LS_2, \ldots LS_n$, respectively, each outgoing line consisting of 16 TDM signal outputs, each of the signal outputs providing 32 TDM channels as does each incoming line. Each outgoing switching unit comprises a switching interface and a time-division switch, as is already known, the switching interface being linked to the time-division switch by a supermultiplex line and also linked to an outgoing line.

The space-division switch CS consists of one or more space-division stages; it is linked to each incoming switching unit $A_1, A_2, \ldots A_n$, by an intermediate line, $LEI_1, LEI_2, \ldots LEI_n$, respectively; it is also linked to each outgoing switching unit $B_1, B_2, \ldots B_n$, by an intermediate outgoing line $LSI_1, LSI_2, \ldots LSI_n$, respectively. Each intermediate incoming line and each intermediate outgoing line is a supermultiplex line containing 512 time-division channels on the assumption of incoming lines $LE_1, LE_2 \ldots LE_n$, and outgoing lines $LS_1, LS_2, \ldots LS_n$, each consisting of 16 multiplexes TDM signal lines each of 32 time-division channels.

Each incoming switching unit $A_1, A_2, \ldots A_n$, is associated with an outgoing switching unit $B_1, B_2, \ldots B_n$, respectively, such as to form terminal modules $ME_1, \ldots ME_2, ME_n$. A terminal module constitutes what is known as a protection unit which complies with the provisions of the specifications which lay down a maximum disturbed call limit should a terminal module fault occur.

The invention applies to a group of terminal modules; a switching network consists of groups of terminal modules such that in each group the traffic of a faulty terminal module is handled by the other terminal modules of said group.

Figure 2:
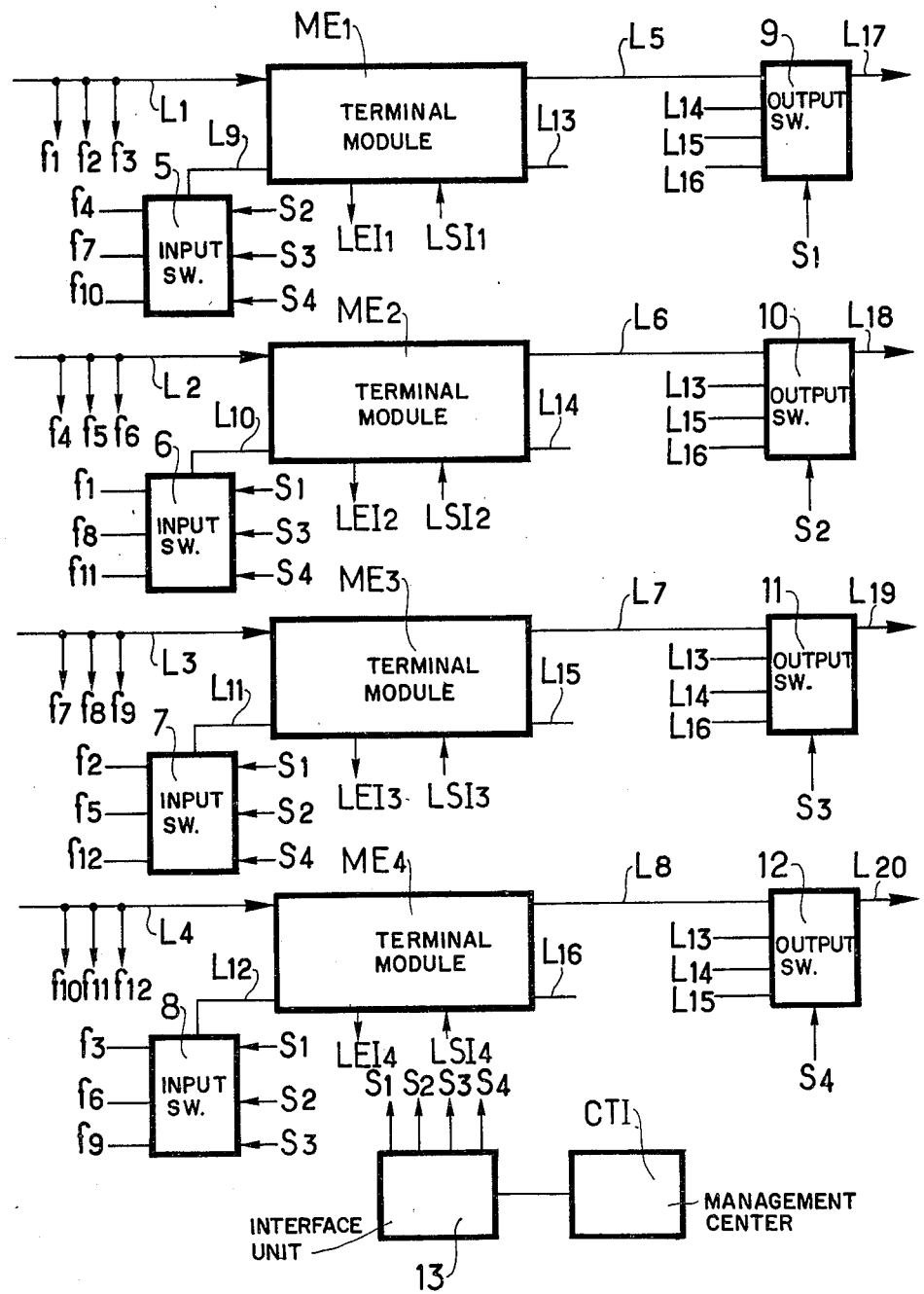
FIG. 2 represents a group of terminal modules

FIG. 2 shows a group of four terminal modules ME1, ME2, ME3, ME4, each of which handles for example 12 TDM signal lines in normal operation with each terminal module capable of handling 16 multiplexes TDM signal lines in degraded operation, that is to say if one of the terminal modules is faulty.

The terminal modules are linked respectively to main incoming lines L1, L2, L3, L4 and to main outgoing lines L5, L6, L7, L8, each of the main incoming lines and the main outgoing lines consisting of 12 TDM signal lines; 5, 6, 7 and 8 are input switches associated respectively with the terminal modules; 9, 10, 11 and 12 are output switches associated respectively with the terminal modules. Each main incoming line is divided into three groups each of four TDM signal lines: main incoming line L1 is divided into three groups, F1, F2, F3; and main incoming line L2 is divided into three groups F4, F5, F6; main incoming line L3 is divided into three groups F7, F8, F9; main incoming line L4 is divided into three groups F10, F11, F12.

The input switch associated with a terminal module is linked to one group of each main incoming line other than the main incoming line of the terminal module with which it is associated. Input switch 5 is linked at its input to groups F4, F7, F10; input switch 6 is linked at its input to groups F1, F8, F11; input switch 7 is linked at its input to groups F2, F5, F12; input switch 8 is linked at its input to groups F3, F6, F9. Each of the input switches 5, 6, 7, 8 is linked to the terminal module with which it is associated by an auxiliary incoming line L9, L10, L11, L12. Each terminal module is linked to the associated outlet switch via a main outgoing line L5, L6, L7, L8 respectively. Each terminal module is linked to an auxiliary outgoing line L13, L14, L15, L16 respectively. Each of the output switches is linked to the auxiliary outgoing lines of the terminal modules other than the auxiliary outgoing of the terminal module with which it is associated. Each of the auxiliary incoming lines and the auxiliary outgoing lines consists of four TDM signal lines. Output switch 9 is linked to auxiliary outgoing lines L24, L15, L16; output switch 10 is linked to auxiliary outgoing line L13, L15, L16; output switch 11 is linked to auxiliary outgoing lines L13, L14, L16; output switch 12 is linked to auxiliary outgoing lines L13, L14, L15. Each output switch 9, 10, 11, 12, is linked at its output to an outgoing lines L17, L18, L19, L20, each consisting of 12 TDM signal lines. A management centre interface unit 13 linked to a management centre CTI of the exchange to which the switching network belongs, has four outputs S1, S2, S3, S4 and issues a "not in service" signal at the output corresponding to the faulty terminal module N1, N2, N3, N4 respectively. Each output switch receives the "not in service" signal corresponding to the terminal module with which it is associated; output switches 9, 10, 11, 12 therefore receive respectively the "not in service" signals from outputs S1, S2, S3, S4. Each input switch receives the "not in service" signals corresponding to the terminal modules other than the signal corresponding to the terminal module with which it is associated; input switch 5 receives the "not in service" signal from outputs S2, S3, S4; input switch 6 receives the "not in service" signals from outputs S1, S3 S4; input switch 7 receives the "not in service" signals from outputs S1, S2, S4; input switch 8 receives the "not in service" signals from S1, S2, S3.

Each terminal module is obviously linked to the space-division switch CS, as in FIG. 1, via an intermediate incoming lines LEI1 to LEI4, respectively, and via an intermediate outgoing lines LSI1 to LSI4 respectively.

Figure 3:
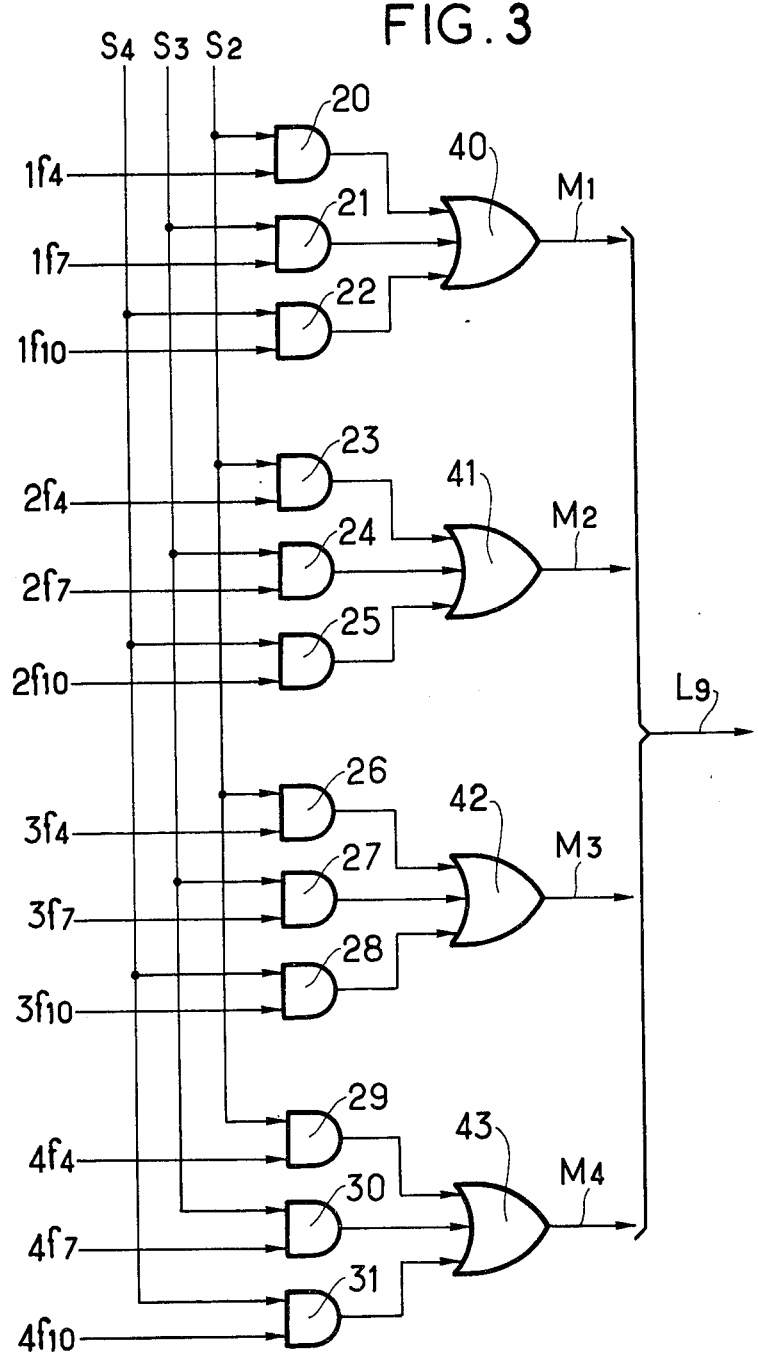
FIG. 3 represents an inlet switch

FIG. 3 shows an input switch such as input switch 5 for example. It comprises 12 AND gates, 20 to 31 and 4 OR gates, 40, 41, 42, 43. The three AND gates 20, 21, 22, have their outputs linked to OR gate 40, the output of which is linked to a TDM signal line M1. AND gates 23, 24, 25 have their outputs linked to OR gate 41, the output of which is linked to a TDM signal line M2. AND gates 26, 27, 28 have their outputs linked to OR gate 42, the output of which is linked to a TDM signal line M3. AND gates 29, 30, 31 have their outputs linked to OR gate 43 the output of which is linked to a TDM signal line M4. The four TDM signal lines M1, M2, M3, M4 constitute the auxiliary incoming line L9 of terminal module ME1 associated with input switch 5.

AND gates 20, 23, 26, 29 have one input linked to output S2 of the management centre interface unit 13. AND gates 21, 24, 27, 30 have one input linked to output S3 of the management centre interface unit 13. AND gates 22, 25, 28, 31 have one input linked to output S4 of the management centre interface unit 13.

It has been stated that groups F1, F2 . . . F12 each form four TDM signal lines; each of the TDM signal lines of group F4 will be designated 1F4, 2F4, 3F4, 4F4, each of the TDM signal lines of group F7 will be designated 1F7, 2F7, 3F7, 4F7, etc. . . .

AND gates 20, 21, 22 have one input linked to lines 1F4, 1F7, 1F10 respectively.

AND gates 23, 24, 25 have one input linked to lines 2F4, 2F7, 2F10 respectively.

AND gates 26, 27, 28 have one input linked to lines 3F4, 3F7, 3F10 respectively.

AND gates 29, 30, 31 have one input linked to lines 4F4, 4F7, 4F10 respectively.

Input switches 6, 7, 8 in FIG. 2 are of course identical to input switch 5 shown in FIG. 3.

For input switches 6, 7, 8 outputs S2, S3, S4 of the management centre interface unit to which the AND gates of input switch 5 are linked, are replaced respectively by outputs S1, S3, S4 or S1, S2, S4 or S1, S2, S3 as shown in FIG. 2.

Similarly, TDM signal lines 1F4 to 4F4, 1F7 to 4F7, 1F10 to 4F10 are replaced by the corresponding TDM signal lines of groups F1, F8, F11 or F2, F5, F12 or F3, F6, F9. Lines M1, M2, M3, M4 then constitute auxiliary incoming lines L10, L11, L12 respectively as shown in FIG. 2.

Figure 4:
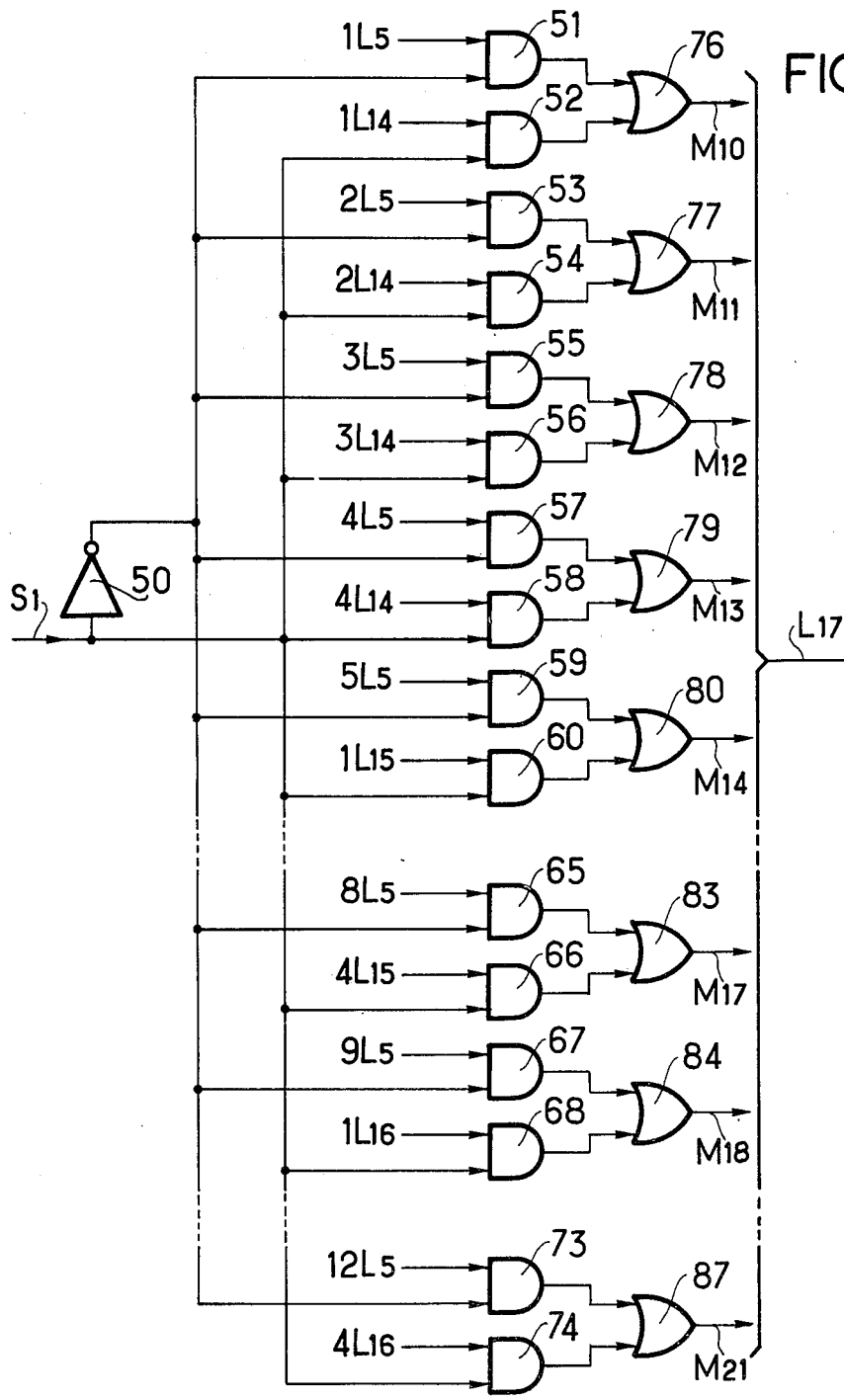
FIG. 4 represents an outlet switch.

FIG. 4 shows an output switch such as output switch 9 for example which has 24 AND gates 51 to 74, each with two inputs, and 12 OR gates 76 to 87 each with two inputs. Each OR gate is linked at its output to a TDM signal line M10 to M21 respectively; these TDM signal lines taken together form outgoing line L17 in FIG. 2. Each OR gate is linked at its inputs to two AND gates; OR gate 76 is linked to AND gates 51, 52, OR gate 77 is linked to AND gates 53, 54, OR gate 78 is linked to AND gates 55, 56, OR gate is linked to AND gates 57, 58, OR gate 80 is linked to AND gates 59, 60, OR gate 83 is linked to AND gates 65, 66, OR gate 84 is linked to AND gates 67, 68, and OR gate 87 is linked to AND gates 73, 74.

For each OR gate, a first AND gate has one input linked to a TDM signal line of the main outgoing line linking an output switch to the associated terminal module. In the case of FIG. 4 which relates to output switch 9, main outgoing line L5 consists of 12 TDM signal line, 1L5, 2L5, . . . 12L5, and one input of the first AND gates 51, 53, 55, 57, 59 . . . 65, 67 . . . 73 is linked to one TDM signal line 1L5, 2L5 . . . 12L5 respectively of main outgoing line L5. Another input of the first AND gates is linked via a changeover switch 50 to output S1 of the management centre interface unit 13. For each OR gate a second AND gate has one input linked to one TDM signal line of the auxiliary outgoing lines linked to the terminal modules other than the one associated with the output switch in question. In the case of FIG. 4 which relates to output switch 9, one input of the second AND gates 52, 54, 56, 58 is linked to TDM lines 1L14, 2L14, 3L14, 4L14 respectively of auxiliary outgoing line L14; one input of the second AND gates 60 to 66 is linked to TDM lines 1L15 to 4L15 respectively of auxiliary outgoing line L15; one input of the second AND gates 68 to 74 is linked to TDM lines 1L16 to 4L16 respectively of auxiliary outgoing line L16. Another input of the second AND gates is linked directly to output S1 of the management centre interface unit 13.

It can be seen that either a TDM signal line of a main outgoing line linking a terminal module and its associated output switch, or a TDM signal line of an auxiliary outgoing line of another terminal module can be switched onto a TDM signal line linked to the output of an OR gate. If there is no signal present at output S1 of the management centre interface unit, indicating that terminal module ME1 is not faulty, the first AND gates 51, 53, 55 . . . 73, one input of which is linked to a TDM signal line of main outgoing line L5, are activated by a signal delivered by changeover switch 50; thus each TDM signal line 1L5, 2L5 . . . 12L5 of main outgoing line L5 is linked to the corresponding TDM signal line M10, M11, . . . M21. If the management centre interface unit 13 delivers a signal at output S1, indicating that terminal module 1 is faulty, the first AND gates 51, 53 . . . 73 are inhibited but the second AND gates 52, 54 . . . 74 are activated since they are linked directly to output S1 in such a way that TDM signal lines 1L14 to 4L14, 1L15 to 4L15, 1L16 to 4L16 are linked to TDM signal lines M10 to M21.

There follows a description of the operation of the device shown in FIG. 2. When all the terminal modules ME1 to ME4 are operating normally, main incoming lines L1, L2, L3, L4 are linked to main outgoing lines L5, L6, L7, L8 respectively, and the outlet switches link main outgoing lines L5, L6, L7, L8 to outgoing lines L17, L18, L19, L20 respectively; there is no signal present at outputs S1, S2, S3, S4 of management centre interface unit 13 and therefore the AND gates of the input switches, FIG. 3, are inhibited.

If a terminal module becomes faulty, and for the purposes of this description we shall assume that terminal module ME1 is faulty, groups F1, F2, F3 of main incoming line L1 which are linked to input switches 6, 7, 8 respectively will be used to route the traffic of main incoming line L1. Since terminal module ME1 is faulty, the management centre interface unit 13 delivers a not in use signal at its corresponding output S1 and this signal activates the AND gates of TDM signal line groups F1, F2, F3 in each input switch 6, 7, 8, linking these TDM signal lines to auxiliary incoming lines L10, L11, L12. These terminal modules ME2, ME3, ME4 link auxiliary incoming lines L10, L11, L12 to auxiliary outgoing lines L14, L15, L16 respectively.

Auxiliary outgoing lines L14, L15, L16 are linked to output switch 9, FIG. 4, which receives the signal delivered by the management centre interface unit 13 at its output S1; the TDM signal lines of auxiliary outgoing lines L14, L15, L16 are therefore linked to signal lines M10 to M21 of output switch 9, which form outgoing line L17.

It can thus be seen that main incoming line L1 is linked to outgoing line L17 although terminal module ME1 is faulty, which means that the traffic on main incoming line L1 can be forwarded.

Output switches 10, 11, and 12 are identical to switch 9 shown in FIG. 4. The TDM signal lines of main outgoing line L5 are merely replaced by the TDM singal lines of the main outgoing line linking the terminal module associated with the output switch in question, the TDM signal lines of the auxiliary outgoing lines are replaced by the auxiliary outgoing lines to which the output switch in question is linked and the link with output S1 of the management centre interface unit 13 is replaced by a link with the corresponding output of said management centre interface unit. TDM signal lines M10 to M21 form outgoing line L17 in the case of output switch 9; these TDM signal lines form the outgoing line associated with the output switch in question, that is L18, L19, L20 respectively for output switches 10, 11, 12.

The device shown in FIG. 2 can therefore be used when a fault condition occurs in one of the terminal modules in the group, to forward the traffic of the main incoming line linked to the faulty terminal module, via the other terminal modules of the group.

As already stated, each terminal module in normal operation handles the traffic of a main incoming line consisting of 12 TDM signal lines, that is to say 48 TDM signal lines for a group of 4 terminal modules, which in this case gives a blocking rate for each terminal module of less than $10^{-13}$ for a traffic of 0.85 erlang. In the conventional solution, which consists of having three terminal modules each handling the traffic of 16 TDM signal lines in normal operation and an additional standby terminal module, the blocking rate per terminal module is of the order of $10^{-5}$ for a traffic of 0.85 erlang. It can therefore be seen that the invention enables the blocking rate to be very substantially reduced, thus improving traffic handling capability; in addition, the terminal modules and their wiring are absolutely identical which is not the case in the conventional solution with the additional terminal module.

In the example described above, main incoming lines L1, L2, L3, L4 each of 12 TDM signal lines replace incoming lines LE1, LE2, LE3, LE4 each of 16 TDM signal lines as shown in FIG. 1, and the terminal modules are not directly linked to outgoing lines L17, L18, L19, L20 each of 12 TDM signal lines which replace outgoing lines LS1, LS2, LS3, each of 16 TDM signal lines as shown in FIG. 1.

It has been assumed in the example described that each terminal module is capable of handling 16 signal lines but in normal service, that is to say when there is no faulty terminal module in the group, it handles only 12 signal lines, which leads to a group of 4 terminal modules.

It is possible to have groups containing a different number of terminal modules and terminal modules capable of handling a number of TDM signal lines other than 16. Assuming that each terminal module is capable of handling n signal lines but that in normal service it handles only m signal lines, each terminal module can handle m−n signal lines of a faulty terminal module; the group must therefore contain $K=k+1$ terminal modules, where $K=m/(n-m)$ if the ratio $m/(n-m)$ give an integer or taking K to be the next higher integer if this ratio is not itself an integer.

The m TDM signal lines of the main incoming line are therefore divided into K groups. A group contains a number of terminal modules such that the product of the number k+1 of terminal modules and the difference (n−m) between the number n of TDM signal lines which can be handled by one terminal module and the number m of TDM signal lines in a main incoming line, is at least equal to the number n of TDM signal lines which can be handled by one terminal module, which is expressed by the relationship:

$$(k+1)\cdot(n-m) \geq n$$

The number K of terminal modules in the group can also be expressd as follows: this number is equal to the ratio of the number n of signal lines which can be handled by one terminal module and the difference n−m between the number n of signal lines which can be handled by one terminal module and the number m of multiplexes in a main incoming line, if this ratio is an integer, and equal to the next higher integer if this ratio is not an integer; $K=n/(n-m)$.

Taking for example, n=16, m=11, the ratio $n/(n-m)=3.2$; K is then taken to be 4. The group contains four modules and each incoming line is divided into three groups, since $k=m/(n-m)$ which is between 2 and 3 and so the higher value must be adopted, that is 3. It is therefore possible to have two groups of five signal lines and one group of one signal line or two groups of four signal lines and one group of three signal lines, the total equalling the 11 TDM signal lines of a main incoming line.

If the solution of two groups of five signal lines is adopted, there will be two terminal modules which will handle 16 signal lines and one module which will handle 12 signal lines, should a fault occur in one terminal module.

If the solution of two groups of four signal lines is adopted, there will be two terminal modules which will handle 15 signal lines and one terminal module which will handle 14 signal lines should a fault occur in one terminal module.

The best case is that for which all the terminal modules handle n TDM signal lines in the case of a fault condition in one terminal module. To achieve this, the ratio $k=m/(n-m)$ must be an integer. Thus in the example described with respect to FIGS. 2, 3 and 4, n=16, m=12 and k=12/4=3 from which we obtain $K=k+1=4$; in the case of a fault condition in one terminal module, the other terminal modules in the group are used to their maximum capacity since they are each handling 16 signal lines.

I claim:

1. Multistage time-division switching network and means for mitigating fault conditions therein, comprising a time-division or space-division signal line incoming stage and outgoing stage, the incoming stage being linked to main incoming lines and the outgoing stage being linked to main outgoing lines, said main incoming lines and main outgoing lines each comprising the same number of signal lines, the incoming stage and outgoing stage each comprising the same number of switching units, a switching unit of the incoming stage and a switching unit of the outgoing stage forming a terminal module linked to a main incoming line and a main outgoing line, each terminal module being capable of handling a number n of signal lines at least equal to that in a main incoming line, characterised in that: (i) the main incoming and main outgoing lines each comprise a number m of signal lines less than the number n of signal lines which a terminal module can handle, (ii) in that the terminal modules are formed into groups, each group comprising a number of terminal modules equal to the ratio of the number n of signal lines which a terminal module can handle and the difference n−m between the number of signal lines which a terminal module can handle and the number of signal lines in a main incoming line if this ratio is an integer, and equal to the next higher integer if this ratio is not itself an integer, (iii) in that each main incoming line is divided into as many groups of signal lines as there are terminal modules minus one, (iv) in that the groups of signal lines of a main incoming line of a terminal module are distributed amongst all the other terminal modules of the group, each group of signal lines containing a number of signal lines at most equal to the difference between the number of signal lines which a module can handle and the number of signal lines of a main incoming line, (v) in that each terminal module is associated with an input switch to which it is linked via an auxiliary incoming line and also with an output switch to which it is linked via a main outgoing line, in that each input switch is linked to one group of signal lines of each of the main incoming lines of the group except the main incoming line of the terminal module with which it is associated, (vi) in that each terminal module is linked via an auxiliary outgoing line to all the output switches of the group, except that with which it is associated, (vii) in that each output switch is linked to an outgoing line containing the same number of signal lines as a main incoming line, and (viii) in that said auxiliary incoming lines and auxiliary outgoing lines consist of the same number of signal lines which is at most equal to the difference between the number n of signal lines which a terminal module can handle and the number m of signal lines of a main incoming line.

2. Time-division switching network in accordance with claim 1, characterised in that each input switch receives a "not in service" signal from a management centre interface unit of said switching network when a terminal module other than that with which it is associated is faulty, said "not in service" signal enabling the group of signal lines from the main incoming line of the faulty terminal module to be linked to the auxiliary incoming line linking said input switch to the associated terminal module.

3. Time-division switching network in accordance with claim 1, characterised in that each output switch receives a "not in service" signal from a management centre interface unit of said switching network when the terminal module with which it is associated is faulty, such as to inhibit any connection between said terminal module and said associated output switch, and to establish a connection between the outgoing line linked to said outlet switch and the auxiliary outgoing lines of the terminal modules which are not faulty.

4. Time-division switching network in accordance with claim 2, characterised in that each input switch comprises as many OR gates as there are signal lines forming an auxiliary incoming line, each OR gate being linked at its input to as many AND gates as there are terminal modules minus one, each AND gate having one input linked to one signal line of a group of signal lines of a different main incoming line and another input linked to an output of the management centre interface unit corresponding to the terminal module linked to the main incoming line of said group of signal lines.

5. Time-division switching network in accordance with claim 3, characterised in that each output switch comprises as many OR gates as there are signal lines in the outgoing line, each OR gate being linked at its input two AND gates, a first AND gate having one input linked to one signal line of the main outgoing line linking an output switch to the associated terminal module, and another input linked via a changeover switch to an output of the management centre interface unit corresponding to the terminal module associated with the output switch, a second AND gate having one input linked to one signal line of an auxiliary outgoing line of the terminal modules other than the auxiliary outgoing line linked to the terminal module associated with the output switch, and another input linked to said output of the management centre interface unit.

* * * * *